Feb. 20, 1923.
S. COOPER
WRAPPING MACHINE
Filed Mar. 19, 1918
1,445,622
6 sheets-sheet 3
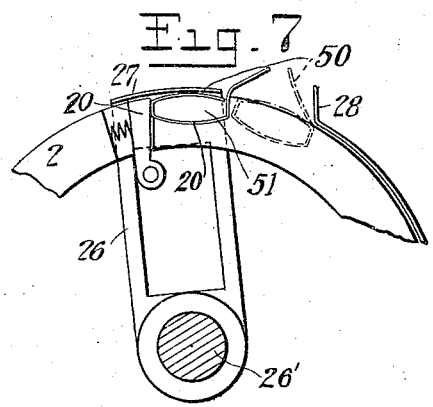
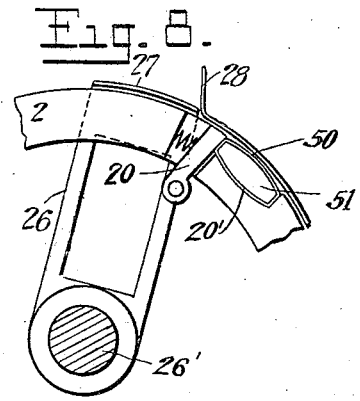
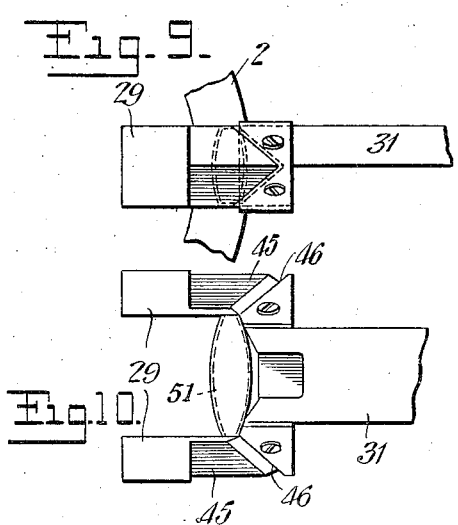
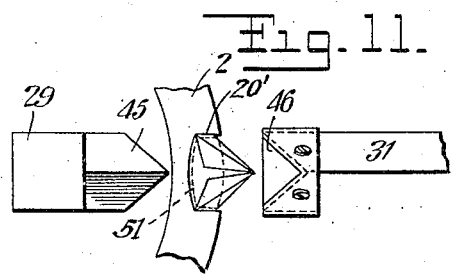
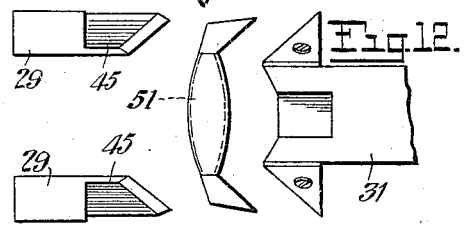
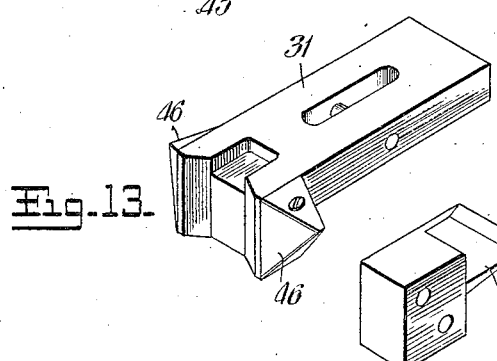
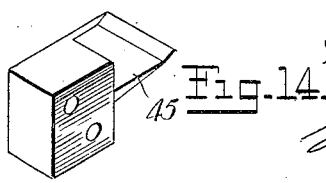
INVENTOR
Simon Cooper
BY
Frank J. Kent
ATTORNEY

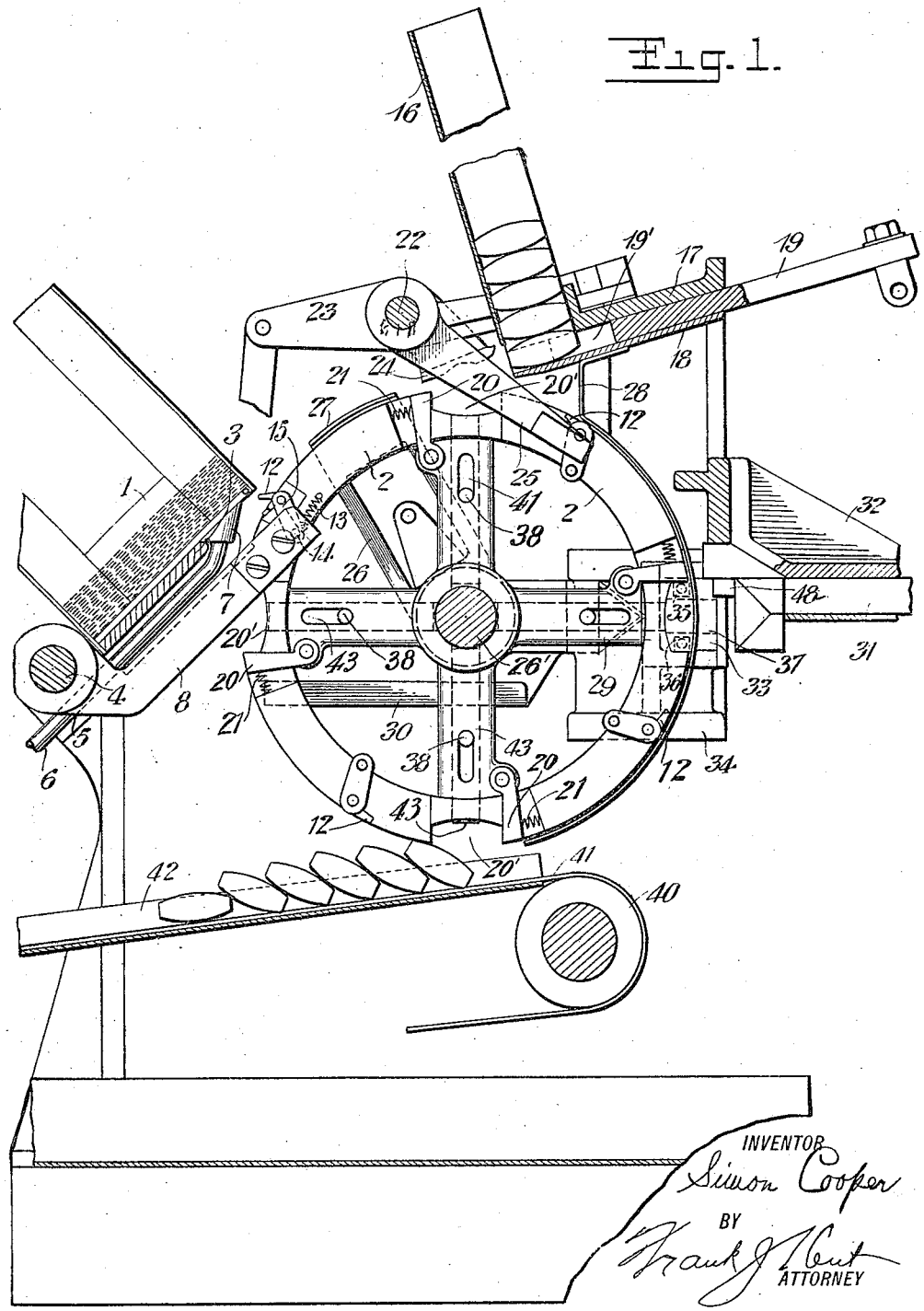

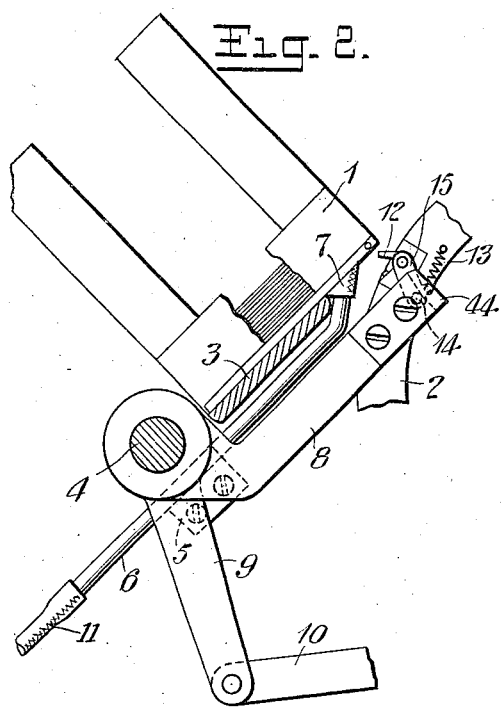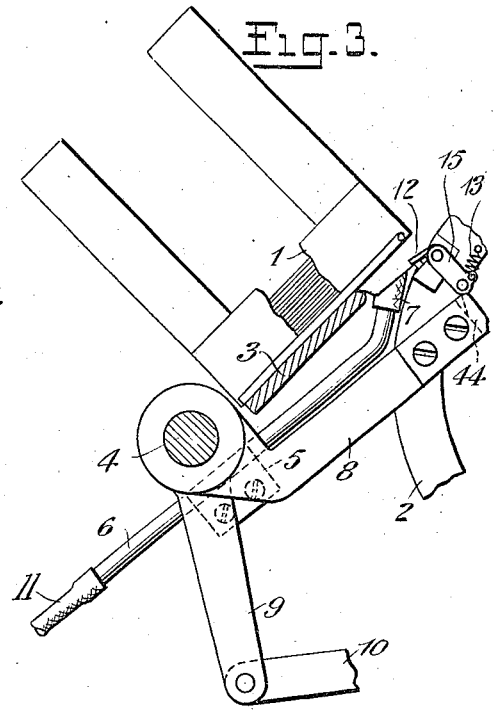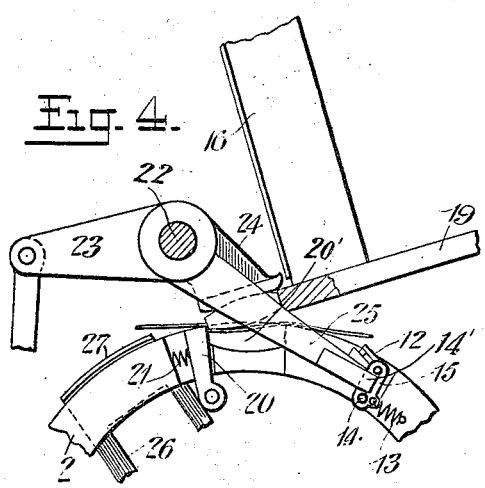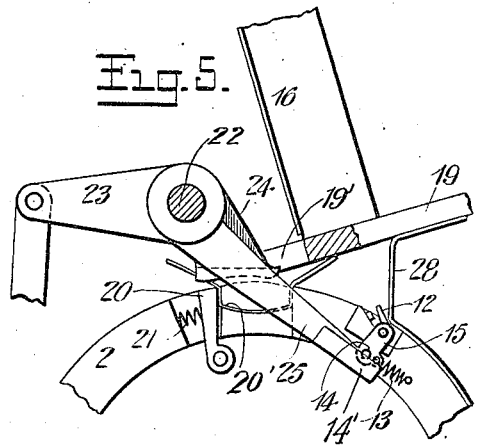

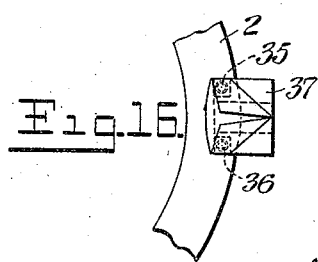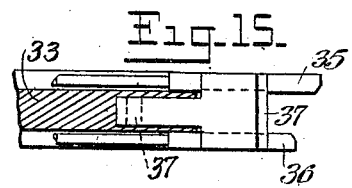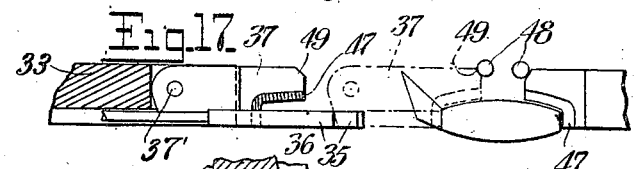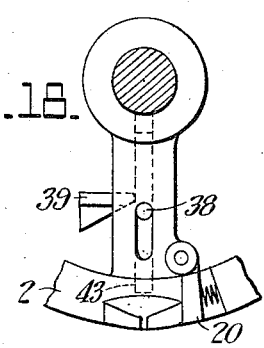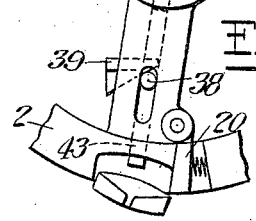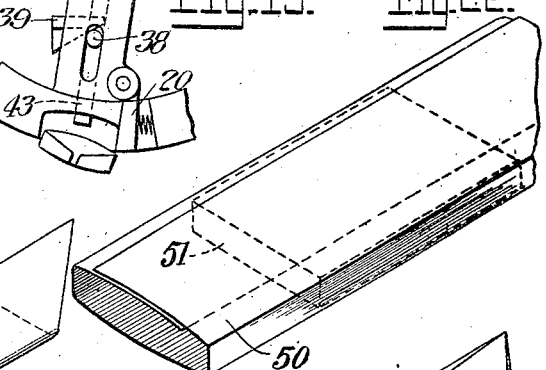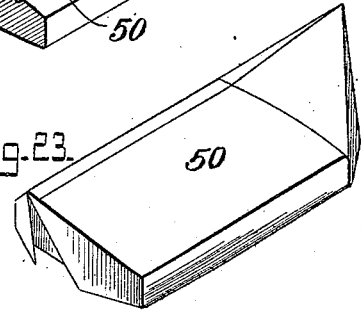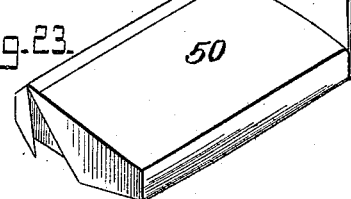

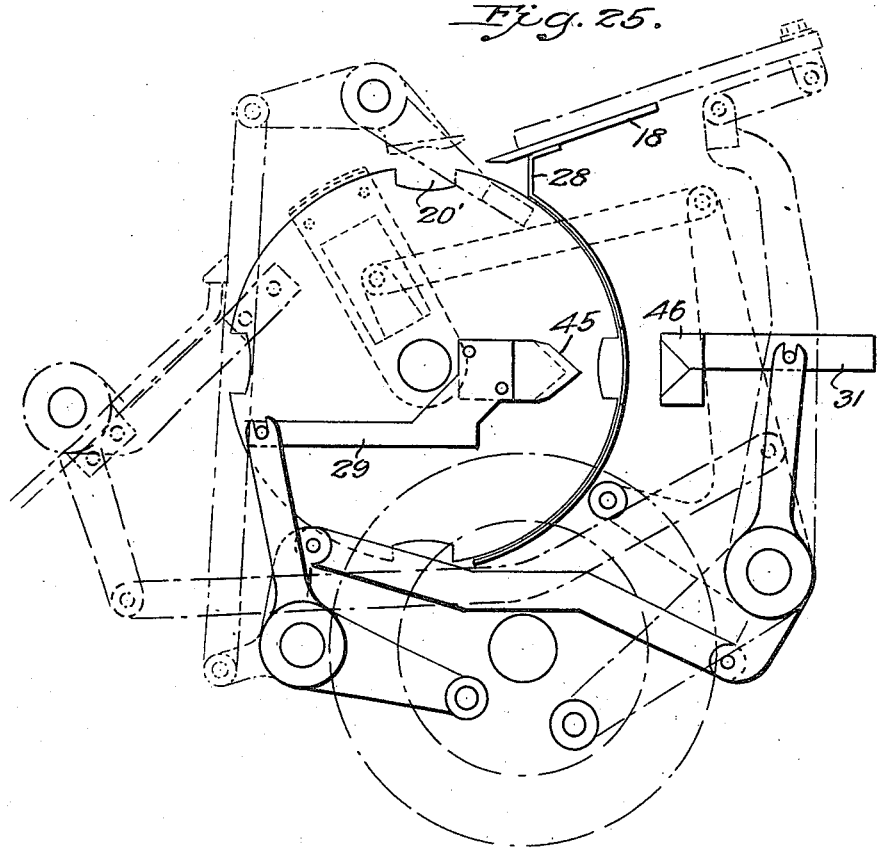

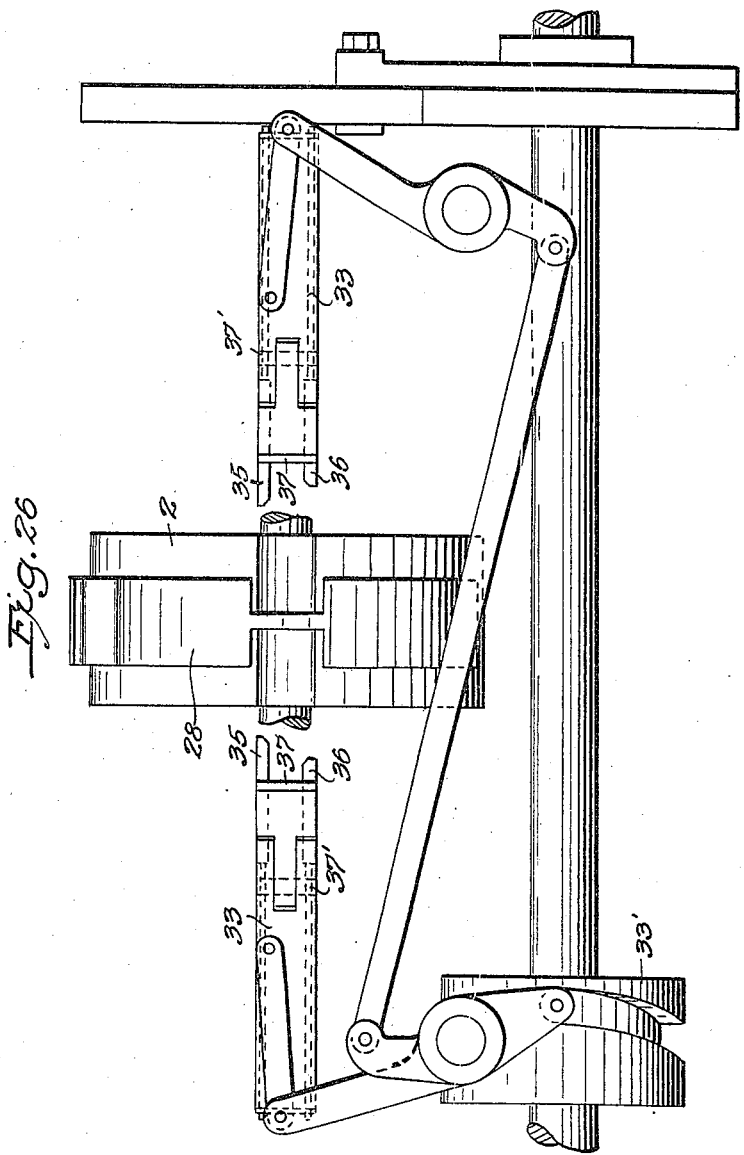

Patented Feb. 20, 1923.

1,445,622

UNITED STATES PATENT OFFICE.

SIMON COOPER, OF BROOKLYN, NEW YORK.

WRAPPING MACHINE.

Application filed March 19, 1918. Serial No. 223,311.

*To all whom it may concern:*

Be it known that I, SIMON COOPER, a citizen of the United States, residing at Brooklyn, in the county of Kings and State of New York, have invented certain new and useful Improvements in Wrapping Machines, of which the following is a specification.

This invention relates to wrapping machines and more particularly to machines for wrapping articles in the nature of cakes of soap.

The general objects of the invention are to provide a machine of relatively simple construction which will be automatic in its operation and which moreover will be rapid and accurate in the performance of its work.

A special object is to obtain a neat and attractive packaging or wrapping of the articles.

Briefly, the invention comprises a carrier in the nature of a rotating drum, provided in its periphery with article-receiving pockets or holders, with means for placing wrappers over said pockets, means for seating the cakes or articles in the pockets on said wrappers and means for folding the wrappers about said articles.

The detailed structure and operation will be made clear as the specification proceeds.

The drawings illustrate a practical embodiment of the invention, wherein Figure 1 is a side elevation of the machine, parts being broken away and shown in section for the sake of clearness; Figures 2 and 3 are broken detail views showing the operation of the wrapper feed; Figures 4 and 5 are like views of the cake or article feed; Figure 6 is a detail view of the gripper releasing member; Figures 7 and 8 are detail views illustrating the action of the primary and secondary folders; Figures 9 and 10 are detail edge and plan views of the prismatic folder in closed position; Figures 11 and 12 are like views of the same in open position; Figures 13 and 14 are detail views of parts of this folder; Figure 15 is a plan view of the final folding mechanism; Figures 16 and 17 are end and side views of the final folder illustrated in Figure 15; Figures 18 and 19 are detail views of the cake ejection; Figure 20 is a detail view of the wrapper as engaged about the cake as the same is seated in the holder; Figures 21 and 22 illustrate the primary and secondary folding operations; Figures 23 and 24 illustrate the end folding operations; Fig. 25 is a view illustrating the arrangement of the end folders with respect to the support for the article and Fig. 26 is a side elevation of the drum and showing the various folders associated therewith and at their proper stations.

The wrappers are stacked in a magazine or hopper 1, whose bottom is partially closed by a supporting wall 3, disposed substantially tangential to and adjacent the periphery of the carrier drum 2.

4 designates a rock shaft to which is secured by clamp 5, a suction tube 6, carrying a suction cup 7, entering the open portion of the magazine bottom to engage the lowermost wrapper of the stack. This shaft may be rocked by a rocker arm 9 receiving motion through link 10 from a suitable cam or other driving element (not shown). Suction is created by a suitable suction generator connected by flexible tubing 11 with the tube 6, so that as the shaft 4 rocks downwardly (Figure 1), the forward or leading edge of the wrapper at the bottom of the stack is carried by the suction cup down into the bite of one of the grippers 12, on the carrier drum. These grippers are normally held closed by springs 13 but are opened to take the wrappers by means of an angular projection or trip 44 on the end of a rigid arm 8 carried by rock shaft 4, which engages projecting pins 14 on the gripper arms 15. Figure 2 shows how, in the intermittent rotary movement of the drum these pins on the gripper arms engage the trip 44 to rock the grippers open to take the wrappers, and Figure 3 shows how as the shaft 4 rocks to carry the wrapper into the bite of the then-opened gripper, the trip finally slides off the trip pin 15, allowing the gripper to close on the wrapper. The wrapper is thus held to the drum and on the next forward step of the drum, the bottom wrapper is withdrawn from the stack and carried forward to the article receiving station.

The article feeding means here comprises a guide or chute 16, for cakes of soap, mounted on a support 17, on an incline such that the lowermost cake will be disposed substantially tangentially of the drum. The lowermost cake rests on a bottom support 18 and is discharged onto the wrapper on the drum by an ejector slide 19, which is reciprocated by suitable means and is provided in its forward end with a cutout 19' receiving and guiding the cake.

The drum is provided with article-receiving pockets 20' in the periphery thereof and the grippers are disposed at points somewhat in advance of these pockets so as to hold the wrappers in position bridging or covering the pockets. The rearward sides or walls of the pockets 20' are preferably made yielding so that the articles when seated therein will be yieldingly gripped and held in place. This is here provided for by making the rear walls of the pockets in the form of pivoted jaws 20, yieldingly forced toward the forward fixed walls of the pockets by springs 21. Figure 4 illustrates how the ejector slide 19 forces the cake against the yielding side of the pocket, thereby opening the pocket to receive the cake. The cake is guided and held down so as to properly enter the pocket by a presser 24, adjacent the discharge side of the cake feeder and overlying the pocket, and while the cake is thus held suspended, pinched between the end of the ejector and the yielding side of the pocket, this presser is rocked downwardly to seat the cake in the pocket. For this purpose the presser 24 is shown mounted on a rock shaft 22 operated from a cam or other suitable mechanism by a rocker arm 23.

This presser also operates to release the gripper from holding engagement with the wrapper, by means of an angular trip 14' on the end of the arm 25 carried by the presser rock shaft 22 and operating as the presser descends, to engage over the pin 14 on the gripper arm and rock the gripper to open position. The effect of these instrumentalities therefore is to seat the cake in the drum pocket on top of the previously positioned wrapper, which is thereby caused to envelop the back and sides of the cake with its opposite edges upstanding at the edges of the cake (see Figures 2 and 20).

As the drum starts forward on its next periodical movement, an arm 26, pivoted on the drum shaft 26', is rocked forwardly at faster speed than the drum so as to cause a folder blade 27, carried thereby and overlying the drum, to overtake the wrapper 50 held in the pocket and fold the rearward upstanding edge of the same down over the exposed outer face of the cake 51, seated in the pocket (see Figures 7 and 21). This primary folder travels forward far enough to hold the rearward edge of the wrapper down until the forward upstanding edge of the wrapper is folded down thereover by a relatively stationary guard and folder 28, which conforms to and partially surrounds the drum—(see Figures 1, 8 and 22). The rearward edge of the wrapper is thus folded forwardly down over the outer face of the cake and the forward edge of the wrapper is then folded from the opposite side, rearwardly down over the first fold.

The end folding devices, which are located at the next station, comprise oppositely disposed cooperating slides 29—31, working substantially at right angles to the axis of the drum and carrying the cooperating pairs of prismatic folder heads 45—46 (Figures 9 to 14 and 25) which fold the opposite ends of the wrapper to the prismatic or pyramidal form shown more particularly in Figures 11, 12 and 23. The slides 29—31 are suitably actuated as indicated in Fig. 25. The slide 31 operates in a housing 32, and slide 29 operates in housing 34, both slides being withdrawn, Figure 1, until the drum rotates far enough to carry the wrapper into position between said folders, whereupon both slides advance and then retreat, leaving the wrapper ends creased and shaped as shown in Figures 11 and 12, standing outward somewhat so as to be readily bent down over the outer face of the package.

The final fold devices appear in Figure 1 and are shown more in detail in Figures 15, 16, 17, and 26, the same comprising slides 33, at opposite sides of the drum, working toward each other in a plane substantially parallel to the axis of the drum. The slides 33 are actuated from a cam 33' through suitable links and levers as shown in Fig. 26, said slides each carrying spring pressed yielding folding fingers 35, 36, for engaging the opposite edge portions of the end fold (Figure 15) and a folding wing 37, pivoted at 37' and arranged to engage and turn the end fold down over the top of the package (Figure 17). One of the yielding edge folding fingers (35) may be somewhat longer than the other so as to start the folding in of the one edge slightly before the opposite edge, this insuring the creasing along certain definite lines. The inner face of each of the wings 37 is shaped to conform generally to the end and outer face of the package and may be lined with a layer 47 of soft rubber or the like to crease the folds firmly in place. A final squeeze may be given to the folded wrapper to give it a certain "set", by causing beveled noses 49 on said final folding wings 37, to engage with relatively stationary abutment shoulders 48 provided on the frame of the machine (see Figures 17 and 1). The sequence of operation of the several folding slides is substantially as follows: The slides 29—31 first come together and form between them the preliminary prismatic end folds (Figures 9 and 10). Slide 29 is then retracted and slides 33 advance, causing first the long yielding finger 35 and then the shorter finger 36 to press the edges of the end fold against the cake. The slide 31 is now withdrawn and as the slides 33 continue their movement toward each other the wings 37 fold over the remaining V-shaped ends of the wrapper and press them down over the outer face of the package. Slides 33 are retracted and the drum then moves forward to carry the wrapper package onto the discharge station, opening of the folds being prevented during this final movement by the guard 28 which overlies the periphery of the drum and preferably extends as far as the discharge station.

At the discharge station there is provided, in the illustration, a belt conveyor 41, traveling over a pulley 40, the upper run of the belt being disposed relatively close to the bottom of the drum and running in a trough 42 which is of a width slightly greater than the length of the packages. Radially disposed slides 43 are provided in the drum for positively ejecting the wrapped articles from the pockets and onto the discharge belt, said ejectors being normally retracted by suitable springs (not shown) and adapted to be projected through the bottoms of the pockets (Figures 1, 18 and 19), by means of the projecting pins 38 carried thereby, which engage a relatively stationary cam 39, as the pocket comes into position over the belt. The belt is preferably advanced intermittently with strokes of slightly less extent than the width of the articles so that the articles will rest on the edge of the belt, partly supported by the preceding articles, as indicated in Figure 1. This facilitates stacking of the articles.

The machine is entirely automatic in its action and is designed to operate accurately and at a relatively high rate of speed.

I claim:

1. In a wrapping machine, means for supporting a stack of wrappers, an article holder, means for placing a wrapper from the stack on said article holder, means for feeding an article into the wrapper thus positioned on the holder, means for folding the wrapper over the exposed longitudinal surfaces of the article, means for prismatically creasing together the extended ends of the wrapper and folding devices acting substantially parallel to the axis of the holder for turning the creased ends over one of the longitudinal faces of the article.

2. In a wrapping machine, means for supporting a stack of wrappers, an article holder, means for placing a wrapper from the stack on said article holder, means for feeding an article into the wrapper thus positioned on the holder, means for folding the wrapper over the exposed longitudinal surfaces of the article, means for initially folding one side of each exposed end against the article and prismatically creasing together the remaining unfolded end portions, and final folding devices acting substantially parallel to the axis of the article holder for turning the creased ends over one of the longitudinal faces of the article.

3. In a wrapping machine, means for supporting a stack of wrappers, an article holder, means for placing a wrapper from the stack on said article holder, means for feeding an article into the wrapper thus positioned on the holder, means for folding the wrapper over the exposed longitudinal surfaces of the article, means for creasing together the exposed ends of the wrappers and means including tuckers and folders acting substantially parallel to the axis of the article holder for finally turning the creased ends over one of the longitudinal faces of the article.

4. In a wrapping machine, means for holding an article with a wrapper applied to the back and opposite sides thereof, means for holding the protruding portions of the wrapper at opposite sides of the article toward each other over the exposed longitudinal front of the article, primary means for creasing together the protruding ends of the thus folded wrapper and a final folding means acting substantially parallel to the axis of the holder for turning the creased ends of the wrapper over one of the longitudinal faces of the article.

5. In a wrapping machine, means for holding an article with a wrapper applied to the back and opposite sides thereof, means for folding the protruding portions of the wrapper at opposite sides of the article toward each other over the exposed longitudinal front of the article, means for prismatically creasing together the ends of the wrapper and means acting substantially parallel to the axis of the holder for turning the prismatically creased ends over one of the longitudinal faces of the article.

6. In a wrapping machine, a rotating support, an article holder on said support, a gripper on said support for holding a wrapper positioned over said article holder, means for placing a wrapper in the bite of said gripper, article supplying means in the path of the holder on the rotating support, means for forcing an article from said supplying means into the holder on top of the wrapper, means associated with said forcing means for releasing the wrapper from the gripper, means in the path of further movement of the holder for folding the wrapper over the article in said holder, and means for releasing the wrapped article from the holder.

7. In a wrapping machine, a rotating support, an article holder on said support, a gripper on said support for holding a wrapper positioned over said article holder, a support for a stack of wrappers, means for placing a wrapper from said stack in the bite of the gripper, article supplying means in the path of the holder on the rotating support, means for forcing an article from said supplying means into the holder on top of the wrapper, means associated with said forcing means for releasing the wrapper from the gripper, means in the path of further movement of the holder for folding the wrapper over the article in said holder, and means for releasing the wrapped article from the holder.

8. In combination, a traveling article carrier, means for seating an article in said carrier on a wrapper, a guard adjacent said means and conforming to the path of movement of the carrier, and folding devices for turning the protruding ends of the wrapper over the outer face of the article seated in the carrier disposed intermediate the length of said guard.

9. In combination, an article carrier, a gripper for holding a wrapper on said carrier, means for opening said gripper to take a wrapper, means for depositing an article on the wrapper held by said gripper, means associated with the depositing means for releasing the gripper from holding engagement with the wrapper, and means for folding said wrapper about the article in the carrier.

10. In combination, an article carrier, a gripper for holding a wrapper on said carrier, means for opening said gripper to take a wrapper, means for depositing an article on the wrapper held by said gripper, a presser for forcing the article into the carrier, means associated with the presser for releasing the gripper from the wrapper and means for folding the wrapper about the article in the carrier.

11. In combination, an article carrier, a gripper for holding a wrapper on said carrier, means for opening said gripper to take a wrapper, means for depositing an article on the wrapper held by said gripper, a presser for forcing the article into the carrier, means connected with said presser for freeing the gripper from the wrapper, and means for folding the wrapper about the article in the carrier.

12. In combination, an article carrier, a gripper for holding a wrapper on said carrier, means for opening said gripper to take a wrapper, means for depositing an article on the wrapper held by said gripper, a presser for seating said article in the carrier, means carried by said presser for freeing the gripper from the wrapper and means for folding the wrapper about the article in the carrier.

13. In a wrapping machine, an article, carrier, a gripper on said carrier for holding a wrapper, a presser for seating an article in the carrier and an arm carried by said presser for operating the gripper.

14. In a wrapping machine, an article carrier, a gripper on said carrier for holding a wrapper, a rocking presser for seating an article in the carrier and a rocking arm carried by said presser for operating the gripper.

15. In a wrapping machine, a carrier wheel provided with article-receiving pockets and wrapper grippers adjacent said pockets, means for supporting a stack of wrappers adjacent the carrier wheel, a rocking separator for separating the wrappers at the base of the stack and a rocking arm carried by said separator for operating the grippers.

16. In a wrapping machine, a carrier drum having article receiving pockets in the periphery thereof, means for placing wrappers over said pockets, means for seating articles in said pockets on said wrappers, an arcuate folding blade traveling with the drum but at a faster rate of movement for folding one edge of the wrappers, a fixed blade for folding the opposite edge of the wrappers, and means for folding the ends of the wrappers together and over the outer face of the article seated within the pocket.

17. In a wrapping machine, a carrier drum having article receiving pockets in the periphery thereof, means for placing wrappers over said pockets, means for seating articles in said pockets on said wrappers, means for folding over the opposite edges of said wrappers, prismatic folding means for creasing together the ends of said wrappers, and tucking means for forming final tucks in the ends of the wrappers.

18. In a wrapping machine, a carrier drum having article receiving pockets in the periphery thereof, means for placing wrappers over said pockets, means for seating articles in said pockets on said wrappers, means for folding opposite edges of said wrappers over the exposed faces of said articles, creasing slides working substantially at right angles to the axis of the drum and tucking slides working substantially parallel to the axis of the drum, said creasing and tucking slides constituting means for folding together the ends of the wrapper.

19. In a wrapping machine, a carrier drum having means for holding an article with a wrapper engaged thereabout, cooperating, prismatic end folding slides working substantially at right angles to the axis of the drum for preliminarily folding together the projecting end portions of the wrapper and final folding slides at opposite sides of the drum working substantially parallel to the axis of the drum for folding the wrapper ends down over the article.

20. In a wrapping machine, means for holding an article with a wrapper engaged thereabout, means for prismatically creasing together the extended ends of the wrapper and tucking and folding means acting substantially parallel to the axis of the holder for turning the creased ends over one longitudinal face of the article.

21. In a wrapping machine, means for initially creasing together the exposed end portions of the wrapper engaged about an article, means for folding the creased end portions over one of the longitudinal faces of the article and means for moving the folding means at an angle to its folding movement to impart a permanent set to the folded wrapper.

In testimony whereof I affix my signature.

SIMON COOPER